United States Patent

Yoneda et al.

[11] Patent Number: 5,976,702
[45] Date of Patent: *Nov. 2, 1999

[54] COMPOSITION FOR SURFACE TREATMENT

[75] Inventors: Takashige Yoneda; Fumiaki Gunji; Takeshi Morimoto, all of Yokohama, Japan

[73] Assignee: Asahi Glass Company Ltd., Tokyo, Japan

[*] Notice: This patent is subject to a terminal disclaimer.

[21] Appl. No.: 08/637,109

[22] Filed: Apr. 24, 1996

[30] Foreign Application Priority Data

Apr. 25, 1995 [JP] Japan ................................ 7-101445

[51] Int. Cl.$^6$ ............................ B32B 17/06; B05D 3/02; C03C 17/30; C09K 3/18
[52] U.S. Cl. ............... 428/429; 106/287.11; 106/287.13; 106/287.14; 106/287.27; 427/387; 427/393.4; 428/447; 428/450; 428/451
[58] Field of Search ................... 428/447, 428, 428/429, 450, 451; 427/393.4, 387; 106/287.11, 287.13, 287.14, 287.27

[56] References Cited

U.S. PATENT DOCUMENTS 5,314,731   5/1994   Yoneda et al. .......................... 428/429
5,464,704   11/1995   Yoneda et al. .......................... 428/429
5,482,768   1/1996   Kawasato et al. ....................... 428/327
5,576,109   11/1996   Yoneda et al. .......................... 428/447
5,605,958   2/1997   Yoneda et al. .......................... 524/755

FOREIGN PATENT DOCUMENTS 0 430 628   6/1991   European Pat. Off. .

OTHER PUBLICATIONS

Chemical Abstracts, vol. 107, No. 22, 1987, AN 199524e, JP–A–62 115 020, May 26, 1987.

Primary Examiner—D. S. Nakarani
Attorney, Agent, or Firm—Oblon, Spivak, McClelland, Maier & Neustadt, P.C.

[57] ABSTRACT

A composition for surface treatment, which comprises a compound of the following formula (A) and an organic solvent (B) comprising an organic compound having a fluorine atom:

$$(R^1)_a(R^2)_b(R^3)_c Si(NCO)_{4-a-b-c} \quad (A)$$

wherein $R^1$ is a monovalent organic group having a carbon number of from 1 to 30;

$R^2$ and $R^3$ are respectively a hydrogen atom or a monovalent organic group having a carbon number of from 1 to 30, which may be the same or different;

a is an integer of from 1 to 3; and b and c are independently 0 or 1 and $1 \leq a+b+c \leq 3$.

16 Claims, No Drawings

COMPOSITION FOR SURFACE TREATMENT

The present invention relates to a novel composition for surface treatment. Particularly, it relates to a composition for surface treatment which can be applied at normal temperature on an article or a substrate, on the surface of which water drops, oil stains, dusts, rubbishes or the like are scarcely deposited and the deposited materials are easily removed. Further, the present invention relates to a substrate treated with such a composition for surface treatment, and relates to a method for surface treatment with such a composition.

Substrates made of various materials and various substrates having treated surface layers are used in various fields. However, adverse effects brought by water drops, oil stains, dusts or rubbishes deposited on the surface of such substrates are problematic.

For example, in transportation equipments such as electric cars, automobiles, ships or aircrafts, the surface of an exterior part such as an outer panel, a window glass, a mirror or a display surface material, an interior part such as an instrument panel, or other articles, is desired to be always clean. If raindrops, dusts or soils are deposited on the surface, or if moisture is condensed thereon by an influence of the temperature or humidity in air, the outer appearance will be impaired. If such a surface is a surface which is directly visually observed or which is directly touched by a person, it may give a filthy impression or may create a hygienic problem.

Further, water or a stain on an article for a transportation equipment may bring about a deterioration of the function of the article. Especially in a case where the article for the transportation equipment is an article for which transparency or a see-through property is required (such as a window glass or a mirror), a deterioration of the transparency or the see-through property may mean that the purpose intended by the article can not be attained, and may cause a serious accident.

Means to remove such dusts accompanied by raindrops, oil stains or water drops (such as removal by wiping off or by means of a wiper) may sometimes impart fine scratch marks on the surface. Further, such scratch marks may sometimes be widened by foreign particles accompanying such dusts, oil stains or water drops. Furthermore, it is well known that when moisture is attached to a glass surface, glass components are likely to elute into the moisture, whereby the surface will be eroded, thus leading to so-called scorching. If the surface is strongly polished or abraded to remove such scorching, a fine roughness is likely to form. At the see-through portion made of glass having substantial scorching or a fine roughness on its surface, its basic function is lowered, and scattering of light on its surface is substantial, whereby it tends to be difficult to secure the field of view, and there will also be a problem from the viewpoint of safety.

Further, dusts, stains or water drops are likely to give a hazardous influence to the surface of an article for a transportation equipment and to promote damages, soiling, yellowing or corrosion. Otherwise they may induce a change in the electrical characteristics, the mechanical properties or the optical properties of the article for a transportation equipment. Adverse effects of this type are problematic not only in the field of articles for transportation equipments but also in various fields including articles for building or building decoration or articles for electric or electronic equipments.

Under these circumstances, it is strongly desired to develop a technique of imparting to a substrate surface a nature of preventing adhesion of dusts, soils and water drops or a nature whereby attached dusts, stains or water drops can easily be removed (such natures will be referred to hereinafter simply as antifouling properties).

As a method for imparting such antifouling properties, a method has heretofore been proposed wherein various compositions for surface treatment are directly coated on the substrate. However, conventional compositions for surface treatment have drawbacks that they require heat treatment during coating and often produce uneven coatings, thus causing some problems on operation. Also, the conventional compositions are unstable and change by themselves as a lapse of time, thus being economically unfavorable. Further, their antifouling properties can not be maintained for a long period of time, and therefore the range of their application has been rather limited.

Still further, it is desired to impart such antifouling properties not only to articles to be produced anew but also to articles which have already been used or in which a deterioration in the performance after treatment has been observed. However, to be useful for all of such articles, the surface treating agent must be capable of imparting antifouling properties simply by directly treating such articles with it at normal temperature. For example, when it is applied to a windshield glass for an automobile which is commercially available, it is practically impossible to replace the windshield glass of each automobile for heat treatment, from the economical reason. Likewise, it is practically impossible to subject the entire automobile to baking after coating. Accordingly, with conventional treating agents, such treatment is difficult or costly.

Accordingly, it is an object of the present invention to provide a composition for surface treatment whereby treatment can be conducted at normal temperature and whereby excellent antifouling properties, chemical resistance, abrasion resistance and weather resistance can be imparted.

The composition for surface treatment of the present invention is an excellent composition for surface treatment improved in stability, workability and economic conditions. That is, the present invention provides a composition for surface treatment which comprises a compound of the formula (A) and an organic solvent (B) comprising an organic compound having a fluorine atom, a substrate, on the surface of which the above composition is coated and dried, and a method for surface treatment which comprises coating the above composition on the surface of a substrate and drying.

$$(R^1)_a(R^2)_b(R^3)_c Si(NCO)_{4-a-b-c} \tag{A}$$

wherein $R^1$ is a $C_1$–$C_{30}$ monovalent organic group;

$R^2$ and $R^3$ are respectively a hydrogen atom or a $C_1$–$C_{30}$ monovalent organic group which may be the same or different;

a is an integer of from 1 to 3; and b and c are independently 0 or 1 and $1 \leq a+b+c \leq 3$.

In the following description, the compound of the formula (A) will be represented by "compound A", and the organic solvent (B) comprising an organic compound having a fluorine atom will be represented by "organic solvent B".

Hereinafter, compound A used in the present invention is described in details. $R^1$ of compound A is a $C_1$–$C_{30}$ monovalent organic group (hereinafter, "monovalent organic group" is simply referred to as "organic group" unless otherwise specified), and $R^2$ and $R^3$ are respectively a hydrogen atom or a $C_1$–$C_{30}$ organic group which may be the same or different.

The $C_1$–$C_{30}$ organic group may be an organic group containing a halogen atom, a functional group, a connecting group or the like, and is preferably a monovalent hydrocarbon group (hereinafter, "monovalent hydrocarbon group" is simply referred to as "hydrocarbon group" unless otherwise specified) or an organic group containing a halogen atom (hereinafter referred to as a "halogenated organic group"). Also, the hydrocarbon group and the halogenated organic group may have a functional group or a connecting group.

The hydrocarbon group may be any of an aliphatic hydrocarbon group and an aromatic hydrocarbon group, and an aliphatic hydrocarbon group is preferable. Examples of the aliphatic hydrocarbon group include preferably an alkyl group, an alkenyl group and a cycloalkyl group, and an alkyl group is particularly preferable, examples of which include a methyl group, an ethyl group, a propyl group and a butyl group. Examples of the aromatic hydrocarbon group include preferably an aryl group.

The halogenated organic group is an organic group, at least one hydrogen atom of which is substituted with a halogen atom. Examples of the halogen atom include preferably a chlorine atom, a fluorine atom and a bromine atom, more preferably a chlorine atom and a fluorine atom, most preferably a fluorine atom. Examples of the halogenated organic group include preferably a halogenated hydrocarbon group, more preferably a halogenated alkyl group. Examples of the halogenated alkyl group include a chloroalkyl group, a fluoroalkyl group and a chlorofluoroalkyl group. Particularly, a polyfluoroorganic group, at least 2 hydrogen atoms of which are substituted with fluorine atoms is preferable as a halogenated organic group.

$R^1$ of compound A is preferably a hydrophobic organic group. Examples of the hydrophobic organic group include preferably a $C_1$–$C_{30}$ organic group having a polyfluoroorganic group or a $C_1$–$C_{30}$ organic group having a long chain hydrocarbon group, more preferably a $C_1$–$C_{30}$ organic group having a polyfluoroorganic group.

As such a polyfluoroorganic group, a polyfluorohydrocarbon group is preferred. Particularly preferred is a polyfluorohydrocarbon group wherein two or more hydrogen atoms in the above hydrocarbon group are substituted by fluorine atoms.

As the polyfluorohydrocarbon group, a polyfluoroalkyl group is particularly preferred. The polyfluoroalkyl group is a group wherein two or more hydrogen atoms of an alkyl group are substituted by fluorine atoms. In the following description, such a polyfluoroalkyl group is represented by $R_f$.

The carbon number of $R_f$ is preferably from 3 to 18. $R_f$ may have a straight chain structure or a branched chain structure. The proportion of fluorine atoms in $R_f$ is preferably such that (the number of fluorine atoms in $R_f$)/(the number of hydrogen atoms in an alkyl group having the same carbon number, which corresponds to $R_f$)×100% is at least 60%, more preferably at least 80%.

Further, $R_f$ may contain an ether-type oxygen atom or a sulfur atom. For example, it may be a polyfluorooxaalkyl group or a polyfluorothioalkyl group. As the polyfluorooxaalkyl group, a group containing a polyfluoroethyleneoxy moiety or a polyfluoropropyleneoxy moiety, and a group containing a polyfluoroethyloxy moiety or a polyfluoropropyloxy moiety, may, for example, be mentioned. Further, as the polyfluorothioalkyl group, a group containing a polyfluoroethylenethio moiety or a polyfluoropropylenethio moiety, or a group containing a polyfluoroethylthio moiety or a polyfluoropropylthio moiety, may, for example, be mentioned. Also, $R_f$ may contain a functional group.

$R_f$ is preferably a perfluoroalkyl group wherein all hydrogen atoms in the above $R_f$ are substituted by fluorine atoms, a group having a perfluoroalkyl moiety, or a group having a perfluoroalkylene moiety. The perfluoroalkyl group or the perfluoroalkyl moiety preferably has a carbon number of from 3 to 21, and the perfluoroalkylene moiety preferably has a carbon number of from 2 to 18.

The $C_1$–$C_{30}$ organic group having a polyfluoroorganic group may contain the above-mentioned polyfluoroorganic group only, but contains preferably a group having a divalent connecting group bonded at the terminal of the polyfluoroorganic group, more preferably a group having a divalent connecting group bonded at the terminal of a $C_1$–$C_{30}$ polyfluoroorganic group.

Further, $R^1$ is preferably an organic group having a polyfluorohydrocarbon group, particularly a $C_3$–$C_{21}$ perfluoroalkyl group, an organic group containing a $C_3$–$C_{21}$ perfluoroalkyl moiety or a group having a divalent connecting group bonded at the terminal of an organic group containing a $C_2$–$C_{18}$ perfluoroalkylene moiety, more particularly a group having a divalent connecting group bonded to a silicon atom (Si(NCO)$_{4-a-b}$) having an isocyanate group bonded thereto.

Examples of the divalent connecting group include various known divalent connecting groups, and are not specially limited. For example, when the divalent connecting group is an alkylene group, an organic group expressed by $C_dF_{2d+1}(CH_2)_e$- (wherein d is an integer of from 3 to 21 and e is an integer of from 1 to 6, preferably 2) is preferable as a hydrophobic organic group. $R_f$ bonded to the divalent connecting group, preferably contains at least one fluorine atom bonded to a carbon atom bonded to the divalent connecting group. Examples of other divalent connecting groups include those described in examples of compound A.

Also, when $R^1$ is a $C_1$–$C_{30}$ organic group having a long chain hydrocarbon group, it is preferably an organic group containing a hydrocarbon group having at least 6 hydrocarbon atoms or an organic group containing a divalent hydrocarbon group having at least 7 carbon atoms, more preferably a $C_6$–$C_{30}$ alkyl group, an organic group containing a $C_7$–$C_{18}$ alkyl moiety or an organic group containing a $C_7$–$C_{18}$ alkylene moiety, most preferably a $C_6$–$C_{30}$ alkyl group.

When $R^1$ is an organic group containing $C_7$–$C_{18}$ alkyl moiety or a $C_7$–$C_{18}$ alkylene moiety, the terminal of the moiety is preferably bonded to a divalent connecting group, and through the divalent connecting group, the terminal of the moiety is preferably bonded to a silicon atom (Si(NCO)$_{4-a-b}$) having an isocyanate group bonded thereto. Examples of the divalent connecting group include connecting groups between $R_f$ and Si illustrated in examples of compound A.

Also, $R^2$ and $R^3$ of compound A used in the present invention are respectively a hydrogen atom or a $C_1$–$C_{30}$ organic group which may be the same or different, and at least one of them is preferably a $C_1$–$C_{30}$ organic group. The $C_1$–$C_{30}$ organic group is preferably an organic group other than the above-mentioned hydrophobic organic groups, and is preferably a $C_1$–$C_4$ hydrocarbon group, a hydrocarbon group having a functional group or a hydrocarbon group substituted with a halogen atom other than a fluorine atom. Also, these groups may be bonded to a silicon atom having an isocyanate group by way of such a divalent connecting group as in the above-mentioned hydrophobic organic groups.

Further, in compound A, a is an integer of from 1 to 3, preferably 1 or 2. This is because the number of an isocyanate group bonded to one silicon atom is preferably at least 2 in view of adhesiveness of compound A to a substrate. Also, when a is 2 or 3, $R^1$ may be the same groups or different groups.

b and c are independently 0 or 1, and $1 \leq a+b+c \leq 3$.

Compound A used in the present invention is more preferably expressed by the formula (A'), wherein $R^4$ is a $C_1$–$C_{30}$ hydrophobic organic group, preferably at least one of $R^4$ being $R_f$-Q- ($R_f$ is a polyfluoroalkyl group and Q is a divalent connecting group), more preferably at least one of $R^4$ being $C_dF_{2d+1}(CH_2)_e$- (wherein d is an integer of from 3 to 21 and e is an integer of from 1 to 6, preferably 2); $R^5$ is a $C_1$–$C_4$ hydrocarbon group, preferably a methyl group; and f is 0 or 1, preferably 0.

$$(R^4)(R^5)_f Si(NCO)_{3-f} \quad (A')$$

In the present invention, compound A is a compound having an isocyanate group in addition to a $C_1$–$C_{30}$ organic group. The isocyanate group is a very important structure unit for elevating adhesiveness of the composition for surface treatment coated on the surface of a substrate. The "adhesiveness" in the present description means chemical and physical bonding state between compound A and the surface of a substrate.

Since the reactivity of the isocyanate group of compound A is very high, it is considered that most of the isocyanate groups is bonded to the surface of a substrate by chemical reaction when treated at normal temperature. That is, in the bonding state, the isocyanate group is considered to be changed. For example, it is considered that the isocyanate group is reacted with a silanol group of the surface of a glass.

Examples of compound A are illustrated hereinafter, but should not be limited thereto. In the following examples, R' is a $C_1$–$C_{30}$ organic group, and when a compound does not have a $R_f$ group, R' is preferably the above-mentioned hydrophobic organic group, particularly a $C_6$–$C_{30}$ alkyl group, and when a compound has a $R_f$ group, R' is preferably a $C_1$–$C_4$ hydrocarbon group. $R_f$ indicates a $R_f$ group.

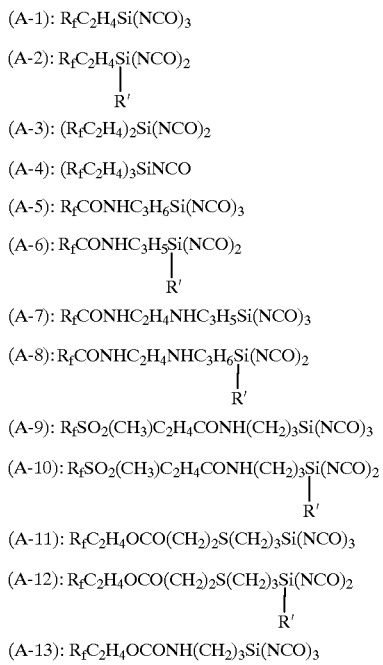

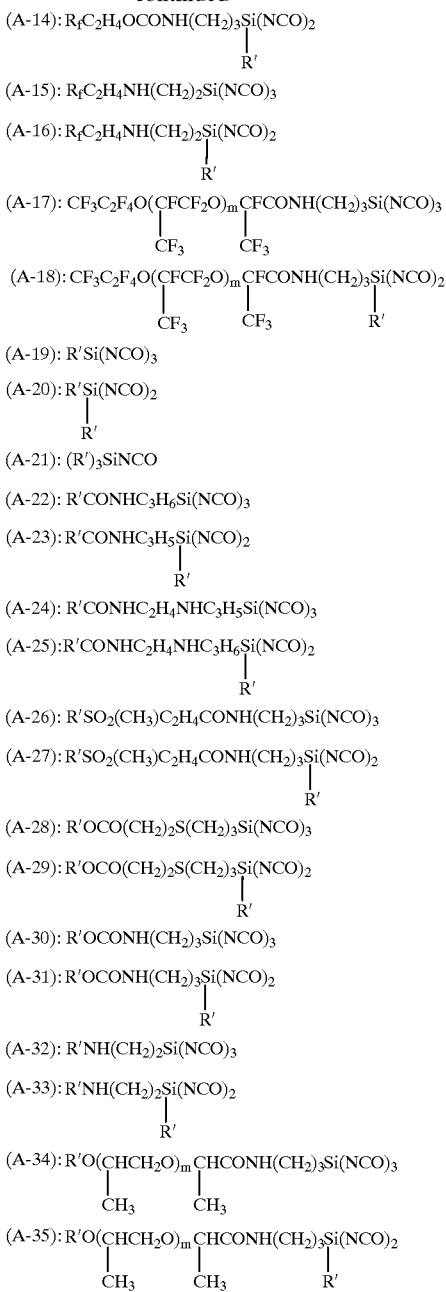

One or two or more of the above-mentioned compounds may be used as compound A. Also, when compound A is a compound containing a $R_f$ group, two or more compounds containing $R_f$ groups having different carbon numbers may be used in a mixture.

Now, another essential component of the present invention, organic solvent B is explained hereinafter in details. Organic solvent B is an organic solvent comprising an organic compound having a fluorine atom. That is, organic solvent B comprises a compound having a fluorine atom and a carbon atom, and is preferably a liquid at normal temperature under normal pressure. Organic solvent B improves stability of the composition for surface treatment, and is a compound having a function as a solvent for improving workability. Thus, it is preferable to select a solvent having a nature excellent in dissolving or dispersing compound A.

In the present invention, if a solvent comprising an organic compound having a fluorine atom is used as organic solvent B, the above-mentioned problem can be solved. Preferable examples of organic solvent B comprising an organic compound having a fluorine atom include conventionally known chlorinated fluorinated hydrocarbon type solvents (HCFC), hydrogenated fluorinated hydrocarbon type solvents (HFC), polyfluorohydrocarbon type solvents, or other fluorinated hydrocarbon type solvents, fluorinated aromatic type solvents or the like.

The bonding state of a fluorine atom in organic solvent B is not specially limited, but in view of availability, a compound having such a structure as a generally known hydrocarbon type solvent, the hydrogen atom of which is substituted with a fluorine atom, is preferably as organic solvent B. Also, if the boiling point of organic solvent B is too high, drying of the solvent after coating is troublesome, and therefore it is generally preferable to employ a solvent having a boiling point not higher than 200° C.

Further, if organic solvent B contains water, there is a fear that the water reacts with an isocyanate group in compound A, and it is therefore preferable to employ an organic solvent containing substantially no water.

When organic solvent B of the present invention is a hydrocarbon type solvent, the hydrogen atom of which is substituted with a fluorine atom, and when organic solvent B is a compound having such a structure as not containing a substituent or a side chain, the number of fluorine atoms in organic solvent B is preferably at least 50% to the total number of hydrogen atoms of the corresponding hydrocarbon type solvent containing no fluorine atom. If the number of fluorine atoms is less than 50%, stability and coating property of the composition are lowered. Examples of organic solvent B of the structure containing no substituent or side chain, include n-$C_8F_{18}$ corresponding to a hydrocarbon type solvent, n-$C_8H_{18}$, or the like.

On the other hand, when organic solvent B is a compound having a side chain or a substituent, it is preferable that at least 50% of all hydrogen atoms in the main chain part of the corresponding hydrocarbon type solvent are substituted with fluorine atoms. If a large amount of hydrogen atoms remain in branched chains or the amount of fluorine atoms in the main chain part is less than 50%, liquid stability and coating property tend to be lowered. In the case of organic solvent B comprising a compound having a side chain or a substituent, it is particularly preferable that the number of a fluorine atom is substantially 100% to the hydrogen atom number of the corresponding hydrocarbon type solvent.

Examples of organic solvent B having a side chain or a substituent include (n-$C_4F_9$)$_3$N corresponding to (n-$C_4H_9$)$_3$N and 1,3-bis(trifluoromethyl)benzene corresponding to m-xylene. A substituent in (n-$C_4F_9$)$_3$N is a n-$C_4F_9$ group, and a substituent in 1,3-bis(trifluoromethyl)benzene is a $CF_3$ group.

Further, it is not preferable to employ a solvent containing a hydrogen atom reactive with an isocyanate group in compound A as organic solvent B. Examples of organic solvent B are illustrated hereinafter, but should not be limited thereto.

2-Bromobenzotrifluoride, 2-chlorobenzotrifluoride, pentafluorobromobenzene, pentafluorochlorobenzene, pentafluoroalkanes, 2-chloro-4'-fluorobenzophenone, 2,4-dichlorobenzotrifluoride, 3,4-dichlorobenzotrifluoride, 1-fluorobenzotrifluoride, chlorinated fluorinated hydrocarbons, 2,2'-ethylidenebis(4,6-di-t-butylphenyl) fluorophosphate, fluorobenzene, 4-nitrofluorobenzene, 2-fluorotoluene, 2-trifluoromethylnitrobenzene, 1,3-bis (trifluoromethyl)benzene, trifluoroacetic anhydride, 1,1,1-trifluoroacetone, benzotrifluoride, perfluoro(tri-n-butylamine)[(n-$C_4F_9$)$_3$N], perfluoro(tri-n-pentylamine)[(n-$C_5F_{11}$)$_3$N], perfluorobenzene, perfluorotoluene, perfluoronaphthalene, perfluoro(methylnaphthalene), perfluoroanthracene, perfluoroxylene, perfluoro(2-n-butyltetrahydrofuran), perfluoro(2-n-propyltetrahydrofuran), and the like.

Further, in view of stability and workability of a treating composition, particularly preferably examples of organic solvent B include perfluoro(tri-n-butylamine), perfluoro(tri-n-pentylamine), perfluoro(2-n-butyltetrahydrofuran), perfluoro(2-n-propyltetrahydrofuran), perfluoroalkanes(n-$C_8F_{18}$ and the like), 1,3-bis(trifluoromethyl)benzene, perfluorobenzene, perfluorotoluene, perfluoroxylene, perfluoronaphthalene, perfluoroanthracene, perfluoro (methylnaphthalene), chlorinated fluorinated hydrocarbons (such as 1,1-dichloro-2,2,3,3,3-pentafluoropropane (225 ca), 1,3-dichloro-1,2,2,3,3-pentafluoropropane (225cb) and 1,1-dichloro-1-fluoroethane (141b)), and the like. Further, organic solvent B in the present invention is not limited to one kind, but may be used in a mixture of two or more kinds.

If an organic solvent such as alcohols containing no fluorine atom, hydrocarbons containing a chlorine atom or a bromine atom, aliphatic hydrocarbons, aromatic hydrocarbons, esters, ketones or ethers is used in place of organic solvent B, the composition for surface treatment is poor in respect of stability, coating property (wetting property) and performances of a film obtained therefrom.

The composition for surface treatment containing the above compound A and organic solvent B achieves excellent effects in respect of stability and coating properties as compared with conventional compositions for surface treatment, and also organic solvent B is satisfactory in respect of safety during operation. It is not clear why the combination of compound A and organic solvent B of the present invention imparts particularly satisfactory stability and coating property to the composition for treating agent, but it is considered as described hereinafter.

When at least one of organic groups contained in compound A includes a hydrophobic organic group, organic solvent B is particularly preferable since it can solvate the hydrophobic organic group in compound A at a very high possibility as compared with other general organic solvents. Also, it is known that crystallinity is raised if the chain length of the hydrophobic organic group becomes longer. However, when organic solvent B solvates the hydrophobic organic group of compound A, the crystallization of the organic group is prevented, thereby improving the stability of the composition for surface treatment.

Most of the above organic solvents B are solvents containing substantially no water. Accordingly, when organic solvent B is used as a solvent, water is not substantially incorporated into the composition for surface treatment, and the reaction between isocyanate groups of compound A in the composition for surface treatment can be prevented, thereby improving stability of the composition for surface treatment.

Further, when organic solvent B solvates a hydrophobic organic group, a molecular force between organic groups is lowered, thereby improving coating property (wetting property) of the composition for surface treatment. Still further, since organic solvent B contains a fluorine atom, it has less influence on a human body and is non-combustible, thus being advantageous in respect of safety during operation.

The composition for surface treatment of the present invention may contain other compounds in addition to compound A and organic solvent B. Examples of the other compounds to be added include other organic solvents. Examples of the other organic solvents are not specially limited, and include alcohols, hydrocarbons containing a halogen atom (chlorine atom, bromine atom or the like) other than a fluorine atom, aliphatic hydrocarbons, aromatic hydrocarbons, esters, ketones, ethers, or the like.

The amount of organic solvent B in the composition for surface treatment is preferably at least 50 parts by weight to 100 parts by weight more preferably to 99.9% by weight of the composition for surface treatment regardless of the presence or absence of other compounds. If the amount of organic solvent B is less than 50 parts by weight, the above-mentioned effect of organic solvent B is hardly realized. On the other hand, the amount of compound A is preferably from 0.1 to 30 parts by weight to 100 parts by weight of the composition for surface treatment in view of a coating thickness of the composition on the surface of a substrate and economic conditions.

The composition for surface treatment of the present invention may further contain other compounds in addition to compound A, organic solvent B and the above-mentioned other organic solvents. Examples of the compounds to be added are optionally selected depending on an aimed use, and are not specially limited. For example, when an additive is contained, it is selected in view of reactivity and compatibility with other components. Examples of the other compounds to be added include ultra-fine particles of various metal oxides, various resins or the like. When a coating film is colored, dyes, pigments or the like may be added.

Further, if electrical conductivity is required, a material whereby a desired resistance can be obtained, such as tin oxide, ITO($In_2O_3$—$SnO_2$) or zinc oxide, may be added. The amount of such an additive may be determined depending on the desired level of resistance and the material.

When the other components including other organic solvents, other compounds or the like, are incorporated into the composition for surface treatment, the amounts should be preferably at a level of from 0.1 to 20 parts by weight to 100 parts by weight of compound A. Incorporation of an excess amount of the other components is undesirable since the antifouling properties, the abrasion resistance or the like of the composition for surface treatment tend to thereby deteriorate.

The composition for surface treatment of the present invention is coated on the surface of a substrate and is dried, thereby imparting various useful properties to the surface of the substrate. When the composition for surface treatment is coated on the surface of a substrate, a pre-treatment may be applied on the surface of the substrate, depending on a particular purpose. Examples of the pre-treatment to be applied, include abrading treatment with cerium oxide, sand blast treatment, acid treatment with diluted hydrofluoric acid, sulfuric acid, nitric acid, hydrochloric acid or the like, alkali treatment with an aqueous solution of sodium hydroxide, potassium hydroxide or the like, discharge treatment with plasma irradiation, and the like. The surface treatment with the composition of the present invention may be conducted without such a pre-treatment.

The application method of the composition for surface treatment of the present invention is not specially limited, and conventionally known various application methods may be employed. For example, such a method as brush coating, casting, rotational coating, dip coating, spray coating or the like, may be employed for coating the composition for surface treatment of the present invention on the surface of a substrate. The composition for surface treatment coated on the surface of a substrate by any of the above methods, is dried to form a film. The drying temperature of the composition for surface treatment of the present invention may be normal temperature, and is preferably from 20 to 30° C. Also, in order to accelerate the drying speed, the drying may be conducted in the presence of heat. When heating the substrate, the heating temperature and time are determined within such an extent as to maintain the heat resistance of the substrate.

The drying may be conducted in air or in a nitrogen atmosphere. Also, it is also preferable to conduct the drying by allowing the substrate to stand under an atmosphere of high humidity. Drying time is generally in the range of from 10 minutes to 5 hours, preferably from 20 minutes to 2 hours.

The coating thickness of the composition for surface treatment of the present invention is optionally controlled by a solid content concentration in the composition, coating conditions, heating conditions and the like, but is not specially limited. Generally, in order to realize antifouling properties, the coating thickness is theoretically required to be at least monomolecular layer thickness, and is preferably at most 2 $\mu$m from economical viewpoint.

The substrate to be used in the present invention is not specially limited, examples of which include inorganic materials such as metal, plastics, ceramics, glass or the like, organic materials, or their composite materials, laminated materials, and the like. Also, the surface of a substrate may be the surface of a substrate itself, the coated surface of a coated metal, the surface-treated surface of a surface treated glass (e.g. surfaces provided with sol-gel film, sputtering film, CVD film, vapor deposition film or the like), and the like.

Also, the shape of a substrate is not specially limited. For example, the substrate may be a flat plate substrate, a substrate having a wholly curved surface, a substrate having a partly curved portion, and the like.

The substrate to be used in the present invention is preferably a substrate made of a transparent material such as glass or the like. Further, an article substrate to be treated with the composition of the present invention is preferably an article making a good use of transparency equipped with a transparent material such as glass. Preferable examples of the articles include articles of transportation equipments or articles for building or building decorations.

The articles for transportation equipments include exterior parts such as outer panels, window glasses, mirror or display surface materials, and interior parts such as instrument panels, in transportation equipments such as electric cars, automobiles, ships or aircrafts, as well as parts and constituting elements used or to be used for other transportation equipments.

For example, bodies, window glasses and pantagraphs of electric cars, bodies, front glasses, side glasses, rear glasses, mirrors or bumpers of automobiles, buses or trucks, bodies and window glasses of ships, and bodies and window glasses of aircrafts, may be mentioned.

Such articles for transportation equipments may be composed solely of the surface-treated substrates such as window glasses for automobiles, or may have the surface-treated substrates incorporated therein, examples of which include back mirrors for automobiles in which glass mirrors are incorporated.

Further, the articles for buildings or building decorations may be articles to be attached to buildings or articles already attached to buildings, or articles for buildings which are used for the buildings, or articles for building decorations such as furniture or equipments, and their constituting elements for articles, such as substrates (including glass plates).

Further examples of the articles for buildings or building decorations include window glass plates, window glasses, glass plates for roofs, various roofs including glass roofs, glass plates for doors or doors having such glass plates installed, glass plates for partitions, glass plates for green houses, or green houses having such glass plates, transparent plastic plates used in place of glasses, articles for buildings (window materials or roof materials) using the transparent plastic plates, wall materials made of ceramics, cement, metals or other materials, mirrors, furniture having such mirrors, and glass for display shelves or showcases.

Such an article for buildings and building decorations may be made of the surface treated substrate alone such as a window glass plate, or may be the one having the surface treated substrate incorporated therein, such as furniture in which a glass mirror is incorporated.

With such substrates and articles, the surfaces of which are treated with the composition of the present invention, water drops which are brought in contact with the treated surfaces are repelled due to the water repellency and scarcely attach to the surfaces, or if attached, the amounts are small and the attached water drops can easily be removed. Especially, with such articles for transportation equipments, during driving, due to the interaction with the receiving wind pressure, water drops rapidly move on the surface and will not remain as water drops, whereby any adverse effect which may otherwise be induced by moisture, ca n be eliminated. Especially in the application to a see-through portion such as a window glass, it becomes easy to secure a viewing field due to dissipation of water drops, thus leading to improvement of the safety of a vehicle.

Further, in an environment where water drops usually freeze, no freezing takes place, or even if freezing takes place, the frozen drops can readily be defrosted. Further, there will be no substantial deposition of water drops, whereby the number of periodical cleaning operations can be reduced. Besides, the cleaning operation is very easy, such being advantageous also for the protection of good appearance.

The composition for surface treatment of the present invention has an excellent stability as well as an advantage of achieving a satisfactory performance by treatment at normal temperature. Also, since any special pre-treatment or post-treatment is not necessary, the operation can be easily carried out. Accordingly, it can be applied not only to a new substrate but also to a substrate already used. Further, the composition for surface treatment of the present invention can be satisfactorily used for repair when performances of films on substrates, the surfaces of which were treated with the composition of the present invention or other treating agents, deteriorated as a lapse of time.

EXAMPLES

Now, the present invention will be described in further detail with reference to Examples. However, it should be understood that the present invention is by no means restricted to such specific Examples.

In the following Examples, the evaluation methods for antifouling properties and antifouling durability were as follows.

Evaluation method for antifouling properties a) The contact angle of water was measured.
b) The contact angle of hexadecane was measured.

c) The finger-print removal properties were evaluated by the following method:

Finger prints were put on the treated surface and wiped with a cotton cloth for 20 reciprocal strokes, whereupon the appearance was inspected and evaluated by the following standards:

A: Oil stains completely and cleanly wiped off.
B: Oil stains slightly remain.
C: Oil stains substantially remain.

d) The water drop remaining degree was evaluated by the following method.

From a nozzle held in a distance of 20 cm from a vertically held plate sample, water was sprayed over the entire surface of the sample for about one hour, whereupon water drops remaining on the surface were visually observed and evaluated in accordance with the following evaluation standards:

A: No water remains on the sample surface.
B: Water slightly remains on the sample surface.
C: Water drops remain in a substantial amount on the sample surface.
D: Water spread wettingly on the sample surface.

Evaluation method for antifouling durability

A sample was immersed in boiling water for 3 hours, whereupon finger print removal properties and water drop remaining degree were evaluated.

Evaluation of liquid stability

A composition for surface treatment was allowed to stand at 50° C. for one month in a thermostat to visually observe the appearance of the composition and to evaluate in accordance with the following evaluation standards:

○: No change in appearance
Δ: Occurrence of cloud
x: Occurrence of precipitate

Example 1

Into a flask equipped with a stirrer and a thermometer, 97.0 g of $(n-C_4F_9)_3N$ and 3.0 g of $n-C_8F_{17}C_2H_4Si(NCO)_3$ were introduced in this order. While maintaining the temperature of the resultant solution at 25° C., stirring was continued for one day to obtain treating composition 1.

1 cc of treating composition 1 was dropped on a glass plate (50 cm×50 cm×2 mm in thickness) which was preliminarily cleaned, and spread by a JK wiper (product manufactured by Jujo Kimberly K. K.) in a manner similar to waxing an automobile. The dropped treating composition 1 uniformly wetted the glass plate and was uniformly spread thereon. Even when drying of the solvent started, the wetting property of the composition was satisfactory and the composition could be easily spread. Also, the lubricity of the composition was satisfactory and the operation was therefore very easy. The glass plate was left to stand for one day to obtain a sample glass. The liquid stability of treating composition 1 and the antifouling properties and the antifouling durability of the sample glass thus obtained, were evaluated, and the results are shown in Table 1.

Example 2

Into a flask equipped with a stirrer and a thermometer, were introduced 97.0 g of $(n-C_5F_{11})_3N$ and 3.0 g of $n-C_8F_{17}C_2H_4Si(NCO)_3$ in this order. While maintaining the temperature of the resultant solution at 25° C., stirring was continued for one day to obtain treating composition 2.

The treating composition 2 thus obtained was spread on a glass plate in the same manner as in Example 1, and was left to stand for one day to obtain a sample glass. The dropped treating composition 2 uniformly wetted the glass plate and was uniformly spread thereon. Even when drying of the solvent started, the wetting property of the composition was satisfactory and the composition could be easily spread. Also, the lubricity of the composition was satisfactory and the operation was therefore very easy. The evaluation results are shown in Table 1.

Example 3

Into a flask equipped with a stirrer and a thermometer, were introduced 97.0 g of perfluoro(2-n-propyltetrahydrofuran) having the following chemical formula and 3.0 g of n-$C_8F_{17}C_2H_4Si(NCO)_3$ in this order.

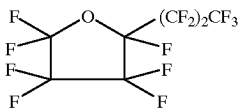

While maintaining the temperature of the resultant solution at 25° C., stirring was continued for one day to obtain treating composition 3.

The treating composition 3 thus obtained was spread on a glass plate in the same manner as in Example 1, and was left to stand for one day to obtain a sample glass. The dropped treating composition 3 uniformly wetted the glass plate and was uniformly spread thereon. Even when drying of the solvent started, the wetting property of the composition was satisfactory and the composition could be easily spread. Also, the lubricity of the composition was satisfactory and the operation was therefore very easy. The evaluation results are shown in Table 1.

Example 4

Into a flask equipped with a stirrer and a thermometer, were introduced 97.0 g of perfluoro(2-n-butyltetrahydrofuran) having the following formula and 3.0 g of n-$C_8F_{17}C_2H_4Si(NCO)_3$ in this order.

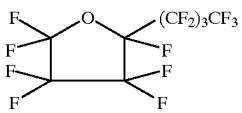

While maintaining the temperature of the resultant solution at 25° C., stirring was continued for one day to obtain treating composition 4.

The treating composition 4 thus obtained was spread on a glass plate in the same manner as in Example 1, and was left to stand for one day to obtain a sample glass. The dropped treating composition 4 uniformly wetted the glass plate and was uniformly spread thereon. Even when drying of the solvent started, the wetting property of the composition was satisfactory and the composition could be easily spread. Also, the lubricity of the composition was satisfactory and the operation was therefore very easy. The evaluation results are shown in Table 1.

Example 5

Into a flask equipped with a stirrer and a thermometer, were introduced 97.0 g of a chlorinated fluorinated hydrocarbon containing 1,3-dichloro-1,1,2,2,3-pentafluoropropane (225cb) (AK-225, manufactured by Asahi Glass Company Ltd.) and 3.0 g of n-$C_8F_{17}C_2H_4Si(NCO)_3$ in this order. While maintaining the temperature of the resultant solution at 25° C., stirring was continued for one day to obtain treating composition 5.

The treating composition 5 thus obtained was spread on a glass plate in the same manner as in Example 1, and was left to stand for one day to obtain a sample glass. The dropped treating composition 5 uniformly wetted the glass plate and was uniformly spread thereon. Even when drying of the solvent started, the wetting property of the composition was satisfactory and the composition could be easily spread. Also, the lubricity of the composition was satisfactory and the operation was therefore very easy. The evaluation results are shown in Table 1.

Example 6

Into a flask equipped with a stirrer and a thermometer, were introduced 97.0 g of 1,3-bis(trifluoromethyl)benzene and 3.0 g of n-$C_8F_{17}C_2H_4Si(NCO)_3$ in this order. While maintaining the temperature of the resultant solution at 25° C., stirring was continued for one day to obtain treating composition 6.

The treating composition 6 thus obtained was spread on a glass plate in the same manner as in Example 1, and was left to stand for one day to obtain a sample glass. The dropped treating composition 6 uniformly wetted the glass plate, and was uniformly spread thereon. Even when drying of the solvent started, the wetting property of the composition was satisfactory and the composition could be easily spread. Also, the lubricity of the composition was satisfactory and the operation was therefore very easy. The evaluation results are shown in Table 1.

COMPARATIVE EXAMPLE 1

Any treatment was not applied on a glass plate of Example 1, and antifouling properties and antifouling durability were evaluated. The evaluation results are shown in Table 1.

COMPARATIVE EXAMPLE 2

Into a flask equipped with a stirrer and a thermometer, were introduced 97.0 g of n-hexane and 3.0 g of n-$C_8F_{17}C_2H_4Si(NCO)_3$ in this order. While maintaining the temperature of the resultant solution at 25° C., stirring was continued for one day to obtain treating composition 7.

5 cc of treating composition 7 was dropped on a glass plate (50 cm×50 cm×2 mm in thickness) which was preliminarily cleaned, and spread by a JK wiper (product manufactured by Jujo Kimberly K. K.) in a manner similar to waxing an automobile. The dropped treating composition 7 was repelled on the glass plate, and it was difficult to uniformly spread treating composition 7 on the glass plate. Also, when drying of the solvent started, the composition was further severely repelled and was hardly spread. The glass plate was left to stand for one day to obtain a sample glass. The liquid stability of treating composition 7 and the antifouling properties and the antifouling durability of the sample glass thus obtained, were evaluated, and the results are shown in Table 1.

COMPARATIVE EXAMPLE 3

Into a flask equipped with a stirrer and a thermometer, were introduced 97.0 g of m-xylene and 3.0 g of n-$C_8F_{17}C_2H_4Si(NCO)_3$ in this order. While maintaining the temperature of the resultant solution at 25° C., stirring was continued for one day to obtain treating composition 8.

The treating composition 8 thus obtained was spread on a glass plate in the same manner as in Example 1, and was left to stand for one day to obtain a sample glass. The dropped treating composition 8 was repelled on the glass plate, and it was difficult to uniformly spread the composition on the glass plate. When drying of the solvent started, the composition was further severely repelled, and it was not easy to spread the composition. The evaluation results are shown in Table 1.

COMPARATIVE EXAMPLE 4

Into a flask equipped with a stirrer and a thermometer, were introduced 97.0 g of ethyl acetate and 3.0 g of n-$C_8F_{17}C_2H_4Si(NCO)_3$ in this order. While maintaining the temperature of the resultant solution at 25° C., stirring was continued for one day to obtain treating composition 9.

The treating composition 9 thus obtained was spread on a glass plate in the same manner as in Example 1, and was left to stand for one day to obtain a sample glass. The dropped treating composition 9 was not so hardly repelled on the glass plate, and could be substantially uniformly spread thereon. However, when drying of the solvent started, the composition began to be repelled and was hardly spread on the glass plate. The evaluation results are shown in Table 1.

Example 7-1 to Example 7-5

The sample glasses obtained in Example 4 were respectively dipped in the following reagents shown in Table 1 for 24 hours, and were taken out and immediately washed to evaluate changes in appearance and antifouling properties of the samples thus treated. The results are shown in Table 2.

TABLE 2

| Example | Reagent | Appearance | Finger print removal properties | Water drop remaining degree |
|---|---|---|---|---|
| 7-1 | Methanol | No change | A | A |
| 7-2 | Acetone | No change | A | A |
| 7-3 | 1% Sulfuric acid aqueous solution | No change | A | A |
| 7-4 | 1% NaOH aqueous solution | No change | A | A |
| 7-5 | Gasoline | No change | A | A |

Example 8

The sample glass obtained in Example 4 was polished with a flannel cloth under a load of 1 kg by 10,000 reciprocal polishing actions. After the polishing test, antifouling properties were evaluated and the results are shown in Table 3.

Example 9

The sample glass obtained in Example 4 was subjected to a weather resistance test having 200 cycles, one cycle of which comprises exposure to ultraviolet ray for 8 hours at 70° C. and exposure to moisture for 4 hours at 50° C. After the weather resistance test, antifouling properties were evaluated and the results are shown in Table 3.

TABLE 1

| | | Initial stage | | | | After durability test | |
|---|---|---|---|---|---|---|---|
| | Liquid stability | Contact angle Hexadecane | Contact angle Water | Finger print removal properties | Water drop remaining degree | Finger print removal properties | Water drop remaining degree |
| Example 1 | ○ | 70° | 111° | A | A | A | A |
| Example 2 | ○ | 70° | 111° | A | A | A | A |
| Example 3 | ○ | 68° | 110° | A | A | A | A |
| Example 4 | ○ | 71° | 111° | A | A | A | A |
| Example 5 | ○ | 67° | 111° | A | A | A | A |
| Example 6 | ○ | 68° | 110° | A | A | A | A |
| Comparative Example 1 | — | 5° | 10° | C | D | C | D |
| Comparative Example 2 | X | 67° | 109° | A | A | B | A |
| Comparative Example 3 | X | 68° | 109° | A | A | B | B |
| Comparative Example 4 | Δ | 69° | 110° | A | A | B | A |

TABLE 3

| Example | Appearance | Contact angle Hexadecane | Contact angle Water | Finger print removal properties | Water drop remaining degree |
|---|---|---|---|---|---|
| 8 | Good | 65° | 104° | A | A |
| 9 | Good | 62° | 102° | A | A |

Example 10

A laminated windshield glass for an automobile was treated in accordance with the method of Example 4, and the windshield glass thus treated was fixed on an automobile. A running test was carried out by driving this automobile for 4 hours during day time and for 2 hours during night time, and the running test was continued for 1 month. A deposition state of soils and dusts on the surface of the windshield glass was checked everyday, and a deposition state of water drops was visually observed during rainy days.

As this result, depositions of soils and dusts, and occurrence of aqueous dirts due to depositions of water drops were not substantially observed, and even when they were deposited, they could be easily removed simply by wiping with a tissue paper. Also, during driving on rainy days, water drops were repelled on the surface of the windshield glass and rapidly moved on the glass surface due to interaction with a receiving wind pressure, and it was easy to secure a viewing field without using a wiper. Further, during the driving test in such an environment (0° C. to −5° C.) as to freeze water drops deposited on an untreated laminated windshield glass or as to have moisture in air condensed and frozen on the untreated laminated windshield glass, no water drops were frozen on the surface of the windshield glass treated in accordance with the present invention. Still further, during the driving test in a more severe environment (−10° C. to −15° C.), some water drops were frozen on the treated windshield glass, but the frozen water drops thawed much more rapidly than in the case of the untreated windshield glass.

Example 11

The same treated laminated windshield glass as used in Example 10 was used as a side glass, a rear glass and a side mirror, and the same driving test was carried out as in Example 10. As this result, the same effects as in Example 10 could be recognized.

Example 12

A laminated windshield glass of an automobile used continuously for 3 years was polished with cerium oxide, and was washed with water and dried. 10 cc of a solution of treating composition 4 was dropped on the surface of the above washed windshield glass, and was spread by a JK wiper (product manufactured by Jujo Kimberly K. K.) in a manner similar to waxing an automobile, and was left to stand for one day. This automobile was subjected to the same running test as in Example 10, but the same effects as in Example 10 could be recognized.

Example 13

A window glass for buildings was treated in accordance with the method of Example 4 to form a coating layer of the composition for surface treatment, and the window glass thus treated was fixed on a house. A deposition state of soils and dusts and a deposition state of water drops during rainy days on the surface of the window glass were visually observed.

As this result, depositions of soils and dusts, and occurrence of aqueous dirts due to depositions of water drops were not substantially observed, and even when they were deposited, they could be easily removed simply by wiping with a tissue paper. Also, during raining, water drops were repelled on the glass surface, and particularly when it was windy, water drops were rapidly moved on the glass surface due to interaction with a receiving wind pressure and it was easy to secure a viewing field. Further, in such an environment (0° C. to −5° C.) as to freeze water drops deposited on an untreated window glass or as to have moisture in air condensed and frozen on the untreated window glass, no water drops were frozen on the surface of the window glass treated in accordance with the present invention. Still further, in a more severe environment (−10° C. to −15° C.), some water drops were frozen on the treated window glass, but the frozen water drops thawed much more rapidly than in the case of the untreated window glass.

The composition for surface treatment of the present invention, a substrate having a coating layer of the composition for surface treatment, and an article having the substrate thus treated, provide the following excellent effects.

(1) The composition for surface treatment of the present invention is excellent in liquid stability and coating properties, and excellent antifouling properties can be achieved by normal temperature treatment. Accordingly, the composition for surface treatment can be applied not only on newly produced articles but also on used articles. Since heat treatment is not required for the surface treatment, the composition for surface treatment can be applied optionally on the desired portion without changing the shape of an article to be treated.

(2) The substrates treated in accordance with the present invention are excellent in abrasion resistance, weather resistance and antifouling properties, and maintain the antifouling properties semipermanently.

(3) Since the substrates treated in accordance with the present invention are excellent in chemical resistance, they can be widely used in various places including coastal areas and places where sea water is directly attached.

(4) The antifouling properties of the substrates treated in accordance with the present invention and articles having the substrates fixed thereon, are particularly suitable in the fields of transportation equipments, buildings and building decorations.

The above-mentioned effects can not be expected in conventional compositions for surface treatment, and the composition of the present invention can be widely applied even to such fields as to have been conventionally impossible heretofore.

What is claimed is:

1. A composition for surface treatment, which comprises a compound of the following formula (A) and an organic solvent (B) comprising an organic compound having a fluorine atom:

$$(R^1)_a(R^2)_b(R^3)_c Si(NCO)_{4-a-b-c} \qquad (A)$$

wherein $R^1$ is a monovalent organic group having a carbon number of from 1 to 30;

$R^2$ and $R^3$ are respectively a hydrogen atom or a monovalent organic group having a carbon number of from 1 to 30, which may be the same or different;

a is an integer of from 1 to 3; and b and c are independently 0 or 1 and $1 \leq a+b+c \leq 3$.

2. The composition for surface treatment according to claim 1, wherein $R^1$ in the formula (A) is a monovalent organic group containing a polyfluoroorganic group or a monovalent organic group containing a $C_1$–$C_{30}$ hydrocarbon group.

3. The composition for surface treatment according to claim 1, wherein $R^1$ in the formula (A) is a perfluoroalkyl group having a carbon number of from 3 to 21, a monovalent organic group having a perfluoroalkyl moiety having a carbon number of from 3 to 21 or a monovalent organic group having a perfluoroalkylene moiety having a carbon number of from 2 to 18.

4. The composition for surface treatment according to claim 1, wherein $R^1$ in the formula (A) is an alkyl group having a carbon number of from 6 to 30, a monovalent organic group having an alkyl moiety having a carbon number of from 6 to 30 or a monovalent organic group having an alkylene moiety having a carbon number of from 7 to 18.

5. A composition for surface treatment, which comprises a compound of the following formula (A') and an organic solvent (B) comprising an organic compound having a fluorine atom:

$(R^4)(R^5)_f Si(NCO)_{3-f}$ (A')

wherein $R^4$ is $C_dF_{2d+1}(CH_2)_e$- (wherein d is an integer of from 3 to 21 and e is an integer of from 1 to 6);
$R^5$ is a monovalent hydrocarbon group having a carbon number of from 1 to 4; and f is 0 or 1.

6. The composition for surface treatment according to claim 1, 2 or 5, wherein the organic solvent (B) is at least one member selected from the group consisting of perfluoro(2-n-butyltetrahydrofuran), perfluoro(2-n-propyltetrahydrofuran), perfluoro(tri-n-butylamine), perfluoro(tri-n-pentylamine), perfluorotoluene, perfluoroxylene, perfluoronaphthalene, perfluoroanthracene, 1,3-bis(trifluoromethyl)benzene, 1,1-dichloro-2,2,3,3,3-pentafluoropropane, 1,3-dicloro-1,2,2,3,3-pentafluoropropane, 1,1-dichloro-1-fluoroethane, perfluoroalkane, perfluorobenzene and perfluoro(methylnaphthalene).

7. The composition for a surface treatment according to claim 1, 2 or 5, wherein the organic solvent (B) is contained in an amount of from 50 to 99.9 parts by weight of the composition for surface treatment.

8. A substrate, on which the composition for surface treatment according to claim 1, 2 or 5 is coated and dried.

9. A method for surface treatment which comprises coating the composition for surface treatment according to claim 1, 2 or 5 on the surface of a substrate and drying.

10. The method for surface treatment according to claim 9, wherein the composition of surface treatment is coated and dried at normal temperature.

11. The composition for surface treatment according to claim 1 or 5, wherein the organic solvent (B) is at least one member selected from the group consisting of 2-bromobenzotrifluoride, 2-chlorobenzotrifluoride, pentafluorobromobenzene, pentafluorochlorobenzne, pentafluoroalkanes, 2-chloro-4'-fluorobenzophenone, 2,4-dichlorobenzotrifluoride, 3,4-dichlorobenzotrifluoride, 3-fluorobenzotrifluoride, chlorinated fluorinated hydrocarbons,2,2'-ethylidenebis (4,6-di-t-butylphenyl) fluorophosphate, fluorobenzene, 4-nitrofluorobenzene, 2-fluorotoluene, 2-trifluoromethyllnitrobenzene, 1,3-bis (trifluoromethyl)benzene, trifluoroacetic anhydride, 1,1,1-trifluoroacetone, benzotrifluoride, perfluoro (tri-n-butylamine), $(n-C_4F_9)_3N$, perfluoro(tri-n-pertyamine), $n-C_5F_{11}N$, perfluorobenzene, perfluorotoluene, perfluoronaphthalene, perfluoro(methylnaphthalene), perfluoroanthracene, perfluoroxylene, perfluoro(2-n-butyltetrahydrofuran) and perfluoro(2-n-propyltetrahydrofuran).

12. The substrate according to claim 8, which is an inorganic material.

13. The substrate according to claim 12, wherein said inorganic material is metal, ceramic or glass.

14. The substrate according to claim 8, which is an organic material.

15. The substrate according to claim 14, wherein said organic material is plastic.

16. The substrate according to claim 8, which is a composite material.

* * * * *